United States Patent
Nielsen

(10) Patent No.: US 8,959,210 B2
(45) Date of Patent: *Feb. 17, 2015

(54) METHOD AND DEVICE FOR AGILE COMPUTING

(71) Applicant: Telefonaktiebolaget L M Ericsson (Publ), Stockholm (SE)

(72) Inventor: Johan Nielsen, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/664,600

(22) Filed: Oct. 31, 2012

(65) Prior Publication Data

US 2013/0060832 A1 Mar. 7, 2013

Related U.S. Application Data

(62) Division of application No. 12/744,045, filed on May 20, 2010, now Pat. No. 8,326,979.

(51) Int. Cl.
*G06F 15/177* (2006.01)
*G06F 9/50* (2006.01)
(Continued)

(52) U.S. Cl.
CPC .......... *G06F 9/5072* (2013.01); *H04L 41/5003* (2013.01); *H04L 43/08* (2013.01); *H04L 1/0002* (2013.01)
USPC ............... 709/224; 709/223; 709/226; 705/1; 705/345

(58) Field of Classification Search
CPC ... G06F 9/5072; H04L 43/08; H04L 41/5003; H04L 1/0002

USPC ............... 709/223–226; 705/1, 345
See application file for complete search history.

(56) References Cited

U.S. PATENT DOCUMENTS 6,804,222 B1   10/2004  Lin et al.
7,089,014 B2 *   8/2006  Brown et al. ................. 455/450
(Continued)

FOREIGN PATENT DOCUMENTS

EP         0 849 909 A2   6/1998
GB         2 416 878 A    2/2006
(Continued)

OTHER PUBLICATIONS

Suri, N., et al.; "Towards an Agile Computing Approach to Dynamic and Adaptive Service-Oriented Architectures;" 1st IEEE Workshop on Autonomic Communications and Network Management (ACNM'07), Munich, Germany, May 2007.
(Continued)

*Primary Examiner* — Razu Miah

(57) ABSTRACT

A method for operating a group of nodes in a system for agile computing comprising a coordinator node and a first computation node communicating via a connection, and wherein the first computation node is adapted to perform a task for the coordinator node is provided. The method comprises the steps of: monitoring at least one operating parameter indicating the quality of the connection between the two nodes; determining a quality parameter based on the operating parameter, wherein the quality parameter indicates the quality of the connection between the two nodes; and transferring information from the first computation node to the coordinator node, when the value of the quality parameter falls within a transfer interval, wherein the information comprises information about a part of a task performed by the first computation node.

5 Claims, 7 Drawing Sheets

(51) Int. Cl.
*H04L 12/24* (2006.01)
*H04L 12/26* (2006.01)
*H04L 1/00* (2006.01)

(56) References Cited

U.S. PATENT DOCUMENTS

| | | | |
|---|---|---|---|
| 7,263,095 B1 | 8/2007 | Sarkar | |
| 7,562,143 B2 | 7/2009 | Fellenstein et al. | |
| 7,609,652 B2* | 10/2009 | Kellerer et al. | 370/252 |
| 7,627,694 B2 | 12/2009 | Sreenivasan et al. | |
| 7,647,590 B2 | 1/2010 | Archer et al. | |
| 7,730,205 B2* | 6/2010 | Rothman et al. | 709/238 |
| 7,805,407 B1 | 9/2010 | Verbeke et al. | |
| 7,996,507 B2* | 8/2011 | Larkin | 709/223 |
| 8,041,773 B2 | 10/2011 | Abu-Ghazaleh et al. | |
| 8,205,000 B2* | 6/2012 | Chang et al. | 709/230 |
| 2002/0083166 A1* | 6/2002 | Dugan et al. | 709/223 |
| 2002/0112040 A1* | 8/2002 | Chang et al. | 709/223 |
| 2002/0145990 A1 | 10/2002 | Sayeedi | |
| 2003/0009553 A1* | 1/2003 | Benfield et al. | 709/224 |
| 2003/0167292 A1* | 9/2003 | Ross | 709/101 |
| 2004/0098447 A1* | 5/2004 | Verbeke et al. | 709/201 |
| 2004/0098474 A1 | 5/2004 | Galou et al. | |
| 2004/0111315 A1* | 6/2004 | Sharma et al. | 705/11 |
| 2004/0260701 A1 | 12/2004 | Lehikoinen et al. | |
| 2005/0054381 A1 | 3/2005 | Lee et al. | |
| 2005/0071298 A1 | 3/2005 | Forman et al. | |
| 2005/0079821 A1 | 4/2005 | Bi | |
| 2005/0099957 A1* | 5/2005 | Soldani et al. | 370/252 |
| 2005/0138175 A1 | 6/2005 | Kumar | |
| 2005/0138517 A1 | 6/2005 | Monitzer | |
| 2005/0147062 A1* | 7/2005 | Khouaja et al. | 370/332 |
| 2005/0188088 A1* | 8/2005 | Fellenstein et al. | 709/226 |
| 2005/0228854 A1* | 10/2005 | Steinheider et al. | 709/200 |
| 2006/0064480 A1* | 3/2006 | Lesartre et al. | 709/224 |
| 2006/0064696 A1* | 3/2006 | Lin et al. | 718/100 |
| 2006/0165040 A1 | 7/2006 | Rathod et al. | |
| 2006/0195508 A1* | 8/2006 | Bernardin et al. | 709/203 |
| 2006/0215633 A1 | 9/2006 | Jennings et al. | |
| 2006/0224712 A1* | 10/2006 | Aho | 709/223 |
| 2006/0294238 A1* | 12/2006 | Naik et al. | 709/226 |
| 2007/0033247 A1* | 2/2007 | Martin | 709/201 |
| 2007/0047461 A1* | 3/2007 | Seo et al. | 370/252 |
| 2007/0082682 A1* | 4/2007 | Kim et al. | 455/456.1 |
| 2007/0162584 A1* | 7/2007 | Kokusho et al. | 709/223 |
| 2007/0208848 A1 | 9/2007 | Bhesania et al. | |
| 2008/0059555 A1 | 3/2008 | Archer et al. | |
| 2008/0074498 A1* | 3/2008 | An | 348/207.1 |
| 2008/0095072 A1* | 4/2008 | Shao et al. | 370/254 |
| 2008/0114638 A1* | 5/2008 | Colliau et al. | 705/9 |
| 2008/0126956 A1 | 5/2008 | Kodosky et al. | |
| 2008/0130728 A1* | 6/2008 | Burgan et al. | 375/222 |
| 2008/0243866 A1 | 10/2008 | Pandey | |
| 2008/0243997 A1* | 10/2008 | Bouzid et al. | 709/203 |
| 2008/0281959 A1 | 11/2008 | Robertson | |
| 2009/0112608 A1* | 4/2009 | Abu-Hakima et al. | 705/1 |
| 2009/0209239 A1* | 8/2009 | Montesdeoca | 455/414.2 |
| 2009/0228329 A1 | 9/2009 | Asanuma | |
| 2010/0191369 A1 | 7/2010 | Kim | |
| 2010/0325121 A1* | 12/2010 | Martin | 707/759 |
| 2011/0302582 A1* | 12/2011 | Jacobson et al. | 718/102 |

FOREIGN PATENT DOCUMENTS

| | | |
|---|---|---|
| RU | 2296362 C1 | 3/2007 |
| WO | WO 2007/122020 A1 | 11/2007 |

OTHER PUBLICATIONS

Phan, T., et al.; "Challenge: Integrating Mobile Wireless Devices Into the Computational Grid;" Proceedings of the 8th Annual International Conference on Mobile Computing and Networking; 2002, Atlanta, Georgia, USA.

Waldburger, J., et al.; "Toward the Mobile Grid: Service Provisioning in a Mobile Dynamic Virtual Organization;" IEEE International Conference on Computer Systems and Applications; Mar. 8, 2006.

Suri, N., et al.; "Resource and Service Discovery in Wireless Ad-Hoc Networks with Agile Computing;" Military Communications Conference; 2006.

Suri, N, et al.; "Agile computing: bridging the gap between grid computing and ad-hoc peer-to-peer resource sharing;" Proceedings of the 3rd IEEE/ACM International Symposium on Cluster Computing and the Grid; May 12-13, 2003.

* cited by examiner

METHOD AND DEVICE FOR AGILE COMPUTING

RELATED APPLICATIONS

This application is a divisional of co-pending U.S. patent application Ser. No. 12/744,045 filed May 20, 2010, which is a 371 of International Application No. PCT/SE2007/050893, filed Nov. 22, 2007, the disclosures of which are fully incorporated herein by reference.

TECHNICAL FIELD

The present invention relates to the field of agile computing, particular to a method, nodes and a system for agile computing.

BACKGROUND

In recent years increased effort has been done towards taking advantage of computation resources in a number of units that are connected in a network in order to increase the total computation capacity. Using the resources of many separate computers connected by a network, such as the Internet, to solve computation problems of large scale is often referred to as grid-computing.

Agile computing also refers to sharing of resources, however agile computing is directed towards a more dynamic and volatile environment with dynamically shifting resources and requirements compared to grid computing. Where grid computing is intended for large computational resources connected e.g. via a static network, agile computing is in particular targeted for use in a much more mobile environment with limited resources e.g. in the form of intermittent connections between units, limited power resources, low bandwidth connections, etc.

The article "Agile Computing: Bridging the Gap between Grid Computing and Ad-hoc Peer-to-Peer Resource Sharing" by Suri, Niranjan et, al., Proceedings of the $3^{rd}$ IEEE/ACM International Symposium on Cluster Computing and the Grid (CCGRID'03) discloses a system of hosts that are arranged in groups and adapted for agile computing.

Nodes in an agile computing environment group are often mobile units, which leads to the risk of breaking the connection between the nodes in the group.

SUMMARY

Due to the dynamic environment of an agile computing system, it has been recognised that computations partly performed by a node of a group may be lost due to the dynamic nature of an agile computing system. For example, if a connection between a computation node performing a task, e.g. computations, and the coordinator node of the group breaks before the computations are completed, then the already performed computations are lost. This means that the computation node has performed superfluous computation wasting time and resources, such as computation resources and battery power, both in the coordinator node and the computation node.

Thus, it is an object of the present invention to provide a method, nodes and a system for agile computing that improves the performance in a system for agile computing.

Accordingly, a method for operating a group of nodes in a system for agile computing comprising a coordinator node and a first computation node communicating via a connection, and wherein the first computation node is adapted to perform a task for the coordinator node, is provided. The method comprises the steps of:

monitoring at least one operating parameter indicating the quality of the connection between the coordinator node and the first computation node, determining a quality parameter based on the operating parameter, wherein the quality parameter indicates the quality of the connection between the coordinator node and the first computation node, and transferring information from the first computation node to the coordinator node, when the value of the quality parameter falls within a transfer interval, wherein the information comprises information about a part of a task performed by the first computation node.

It is an important advantage of the present invention that agile computing is enabled to be used also in environments with a very high mobility where nodes enter and leave groups frequently which leads to frequent breaking of connections.

Furthermore, a computation node for agile computing is provided, the computation node being adapted to receive and perform a task from a coordinator node via a connection, comprising:

a monitor device adapted to monitor at least one operating parameter indicating the quality of the connection between the coordinator node and the computation node, a calculator device adapted to determine a quality parameter based on the at least one operating parameter, wherein the quality parameter indicates the quality of the connection between the coordinator node and the computation node, and a transmitter device adapted to transfer information from the computation node to the coordinator node, when the value of the quality parameter falls within a transfer interval, wherein the information comprises information about a part of the task performed by the computation node.

Further in accordance with the present invention, a coordinator node for agile computing is provided, wherein the coordinator node is adapted to determine distribution of and distribute tasks to one or more computation nodes in a group, and is adapted to receive information about a part of a task distributed to a first computation node, e.g. when a quality parameter that is determined on basis of on one or more operating parameters falls within a transfer interval.

It is an important advantage of the present invention that the amount of redundant computations in a system for agile computing is reduced, which leads to a more efficient utilization of computation resources.

Further, it is an advantage of the present invention that the risk of deadlocks, e.g. where the coordinator node awaits information from a computation node that has disappeared, is reduced.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein.

DETAILED DESCRIPTION OF THE INVENTION

Figure 1:
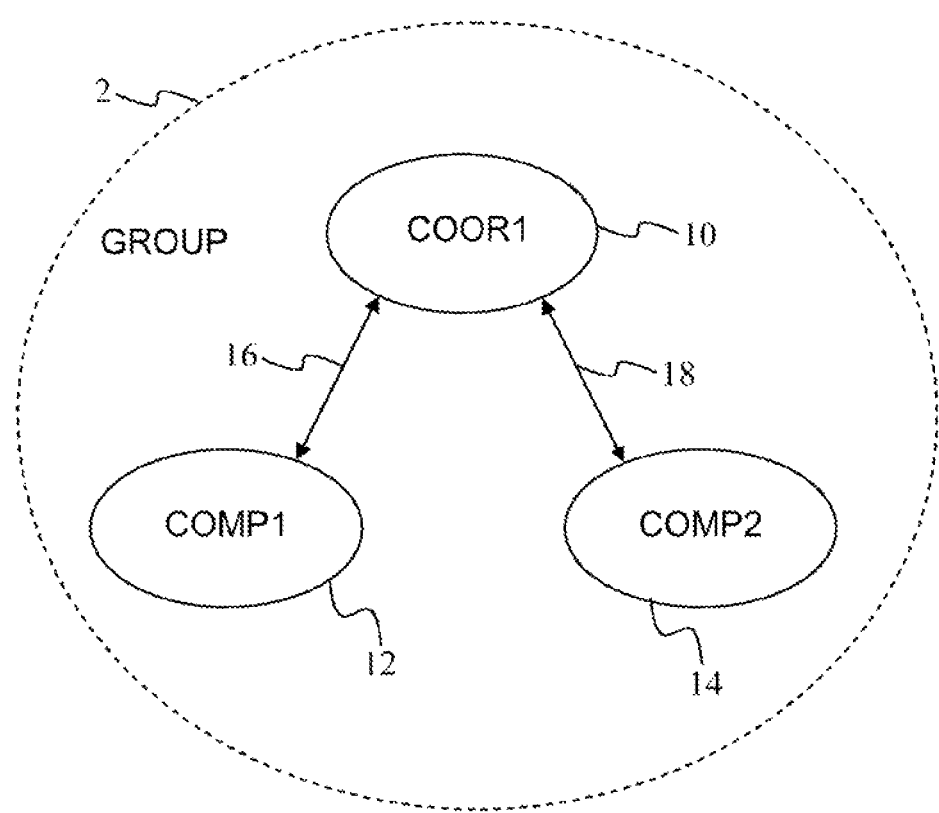
FIG. 1 illustrates an embodiment of a system for agile computing according to the invention.

The figures are schematic and simplified for clarity, and they merely show details which are essential to the understanding of the invention, while other details have been left out. Throughout, the same reference numerals are used for identical or corresponding parts or steps.

Figure 2:
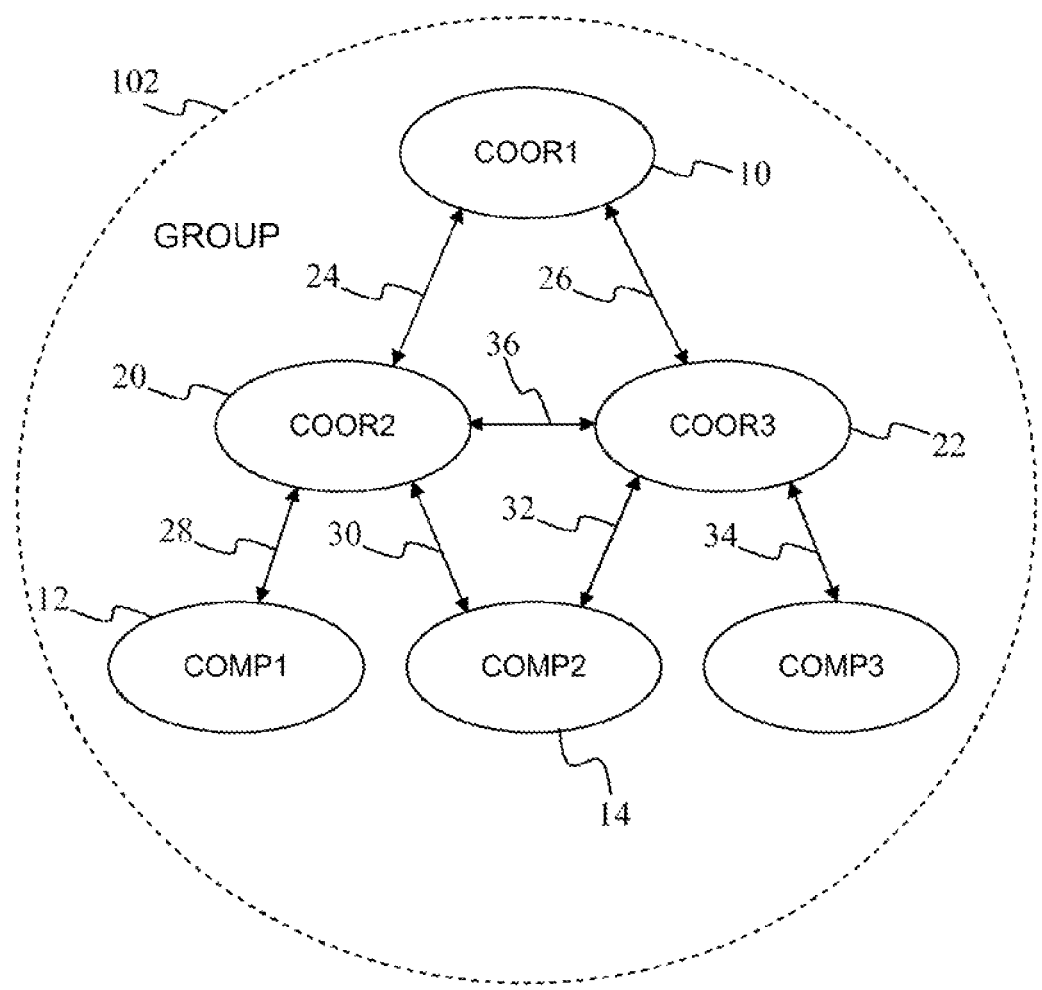
FIG. 2 illustrates an embodiment of a system for agile computing according to the invention.

In a system for agile computing, coordinator node(s) and computation node(s) are arranged in one or more groups or zones, see e.g. FIGS. 1 and 2. A group in a system for agile computing may comprise any number of coordinator nodes, e.g. one, two, three, or more coordinator nodes. Furthermore, a group may comprise any number of computation nodes, e.g. one, two, three, or more computation nodes. The present invention relates in particular to the situation, where a node in a group in one way or another looses or is about to loose its connection with other nodes in the group.

The coordinator node is responsible for allocating and distributing tasks to other nodes, e.g. to one or more computation nodes or to other coordinator nodes. A task may include computations, such as data processing, and/or measurements of one or more physical quantities.

FIGS. 1 and 2 schematically illustrates embodiments of a system adapted for agile computing in accordance with the present invention.

In FIG. 1, the system for agile computing comprises a group 2 comprising at least one coordinator node including a first coordinator node COOR1, 10. The first coordinator node 10 is adapted for distributing tasks to at least one computation node in the group 2, wherein the at least one computation node including a first computation node COMP1, 12 and/or a second computation node COMP2, 14. In the illustrated embodiment, the first coordinator node 10 communicates with the first computation node 12 and the second computation node 14 via first and second connections 16, 18, respectively. In the illustrated embodiment, the first connection 16 and the second connection 18 are wireless. In an embodiment, the first connection 16 and/or the second connection 18 may be a wired connection.

FIG. 2 schematically illustrates a group 102 of a system for agile computing. The group 102 comprises at least one coordinator node including a first coordinator node COOR1, 10. In FIG. 2, the first coordinator node 10 is adapted for distributing tasks to at least one further coordinator node, wherein the at least one further coordinator node comprises a second coordinator node COOR2, 20 and/or a third coordinator node COOR3, 22, e.g. via connections 24, 26. The second coordinator node 20 distributes the tasks from the first coordinator node 10 to computing nodes COMP1, 12 and COMP2, 14 via connections 28, 30, respectively, and the third coordinator node 22 distributes the tasks from the first coordinator node 10 to computing nodes COMP2 and COMP3 via connections 32, 34, respectively. Optionally, the second coordinator node 20 and the third coordinator node 22 communicates via connection 36. The first coordinator node operates as a master coordinator node. In an embodiment, the first coordinator node 10 may also communicate with one or more computation nodes (not shown). In an embodiment, a coordinator node also operates as a computation node performing tasks.

Typically, nodes in a system for agile computing are mobile, such as mobile terminals or terminals mounted on mobile units, however nodes may also be stationary. Examples of devices that may be adapted to operate as a node in a system for agile computing include, but are not limited to: a computer, a mobile phone, a PDA, a GPS unit, a laptop or other portable devices. However, any device having computation resources that are not fully utilized may in principle be adapted for agile computing, such as devices with free computation resources or devices capable of performing a desired task e.g. in a car.

The connections between respective nodes in a system for agile computing may be wired, wireless or a combination thereof. A number of protocols may be used for communication between nodes, e.g. the Bluetooth protocol, Internet Protocol, WIFI, LAN-protocols, etc. Accordingly, the nodes of a system for agile computing are adapted for communicating with other nodes of the system in order to communicate data, software, and other information to other nodes of the system.

A system for agile computing is described in "Towards an Agile Computing Approach to Dynamic and Adaptive Service-Oriented Architectures" by Suri, Niranjan et. al., 1$^{st}$ IEEE Workshop on Autonomic Communications and Network Management (ACNM'07), page 25-31, May 2007.

Further it is an advantage of the present invention that a coordinator node is enabled to distribute tasks in a more efficient way both with regard to time and computation power.

In the method according to the present invention, the step of monitoring at least one operating parameter may comprise measuring the signal strength of a signal between the coordinator node and a computation node in the system. The signal strength of any signal from the coordinator node may constitute an operating parameter, such as the signal strength of a pilot channel, signal strength of data signals to the first computation node or other nodes or the like.

The at least one operating parameter may in an embodiment include the battery power of the first computation node and/or the coordinator node. Additionally or alternatively, the at least one operating parameter may include other parameters, e.g. noise level for calculating the signal to noise ratio.

The quality parameter may be determined or calculated based on one or a plurality of operating parameters, e.g. one or more sampled values of one or more operating parameters at different points of time. This can be expressed as:

$$Q = f(O_{i,k}),$$

where Q is the quality parameter and $O_{i,k}$ is the value of the i'th operating parameter at time k.

In an embodiment of the invention, the step of determining the quality parameter comprises determining the quality parameter based on the signal-to-noise ratio of a signal between the coordinator node and the first computation node.

Preferably, the step of transferring information is performed when the value of the quality parameter falls below a transfer threshold value $T_{transfer}$, i.e. when $Q < T_{transfer}$.

Before a task is initiated on a computation node, the coordinator node and/or the computation node may be adapted to evaluate the quality of the connection and decide whether to distribute a task based on that evaluation. Accordingly, the method may comprise the step of:

distributing the task to the first computation node only when the quality parameter is at or above an initiation threshold value $T_{initiate}$.

The step of distributing the task may be performed prior to the step of monitoring at least one operating parameter, i.e. when $Q \geq T_{initiate}$.

Usually, a computation node continues a task until completed. However, due to the limited calculation or power resources of a computation node and in order to avoid waste of power and other resources it may be desirable to be able to stop an ongoing task in the computation node if the connection between the coordinator node and the computation node is broken. On the other hand, it may be desired to continue the task in order to complete the task in case the computation node will be able to send the result to the coordinator node via an alternative or the same connection at a later time.

After the step of transferring information, and/or if the computation node realizes that the step of transferring information has not been completed, e.g. due to a broken connection, and/or if the connection between the coordinator node and the computation node has disappeared, it may be decided whether the computation node should stop or continue performing the remaining part of the task. Accordingly, the method may further comprise the step of:

deciding whether the first computation node should stop or continue performing the task after the step of transferring information about the performed part of the task.

By enabling the computation node to stop a task, the method according to the invention hereby provides a better utilization of resources in a system for agile computing by avoiding superfluous computations in a computation node thereby saving limited resources of that node.

In a preferred embodiment, the value of the quality parameter depends on the quality of the connection between the coordinator node and the computation node. If the connection between the coordinator node and the computation node is poor, it may be desirable to have alternative routes of communication between the two. Accordingly, the method may further comprise the step of:

attempting to set up an alternative connection between the coordinator node and the first computation node, e.g. when the value of the quality parameter falls within a setup interval.

The step of attempting to set up an alternative connection may be performed when the value of the quality parameter falls below a setup threshold value $T_{setup}$, i.e. when $Q<T_{setup}$.

The transfer interval and the setup interval may be set and/or changed by the coordinator node and/or the first computation node.

The alternative connection between the coordinator node and the first computation node may be a connection via a further computation node and/or a further coordinator node in the group.

When the coordinator node receives information from the first computation node about the part of a task performed by the first computation node, the remaining part of the task may be redistributed in order to ensure completion of the task.

Accordingly, the method may comprise the steps of:
the coordinator node determining the distribution of the remaining part of the task of the first computation node based on information from the first computation node, and
the coordinator node distributing the remaining part of the task of the first computation node to at least one computation node in the group.

The remaining part of the task may be redistributed to the first computation node if a connection has been restored or still exists and/or to other computation nodes in the group. Redistribution of the remaining part of the task to the first computation node may be determined on basis of the value of a quality parameter, e.g. the remaining part of the task may be redistributed to the first coordinator node if $Q \geq T_{initiate}$.

Preferably, monitoring of the at least one operating parameter is performed by the first computation node, however a coordinator node may additionally or alternatively also monitor at least one operating parameter.

The information transferred in the step of transferring information may comprise information regarding the value of the quality parameter and/or information that the value of the quality parameter has fallen within the transfer interval.

Figure 3:
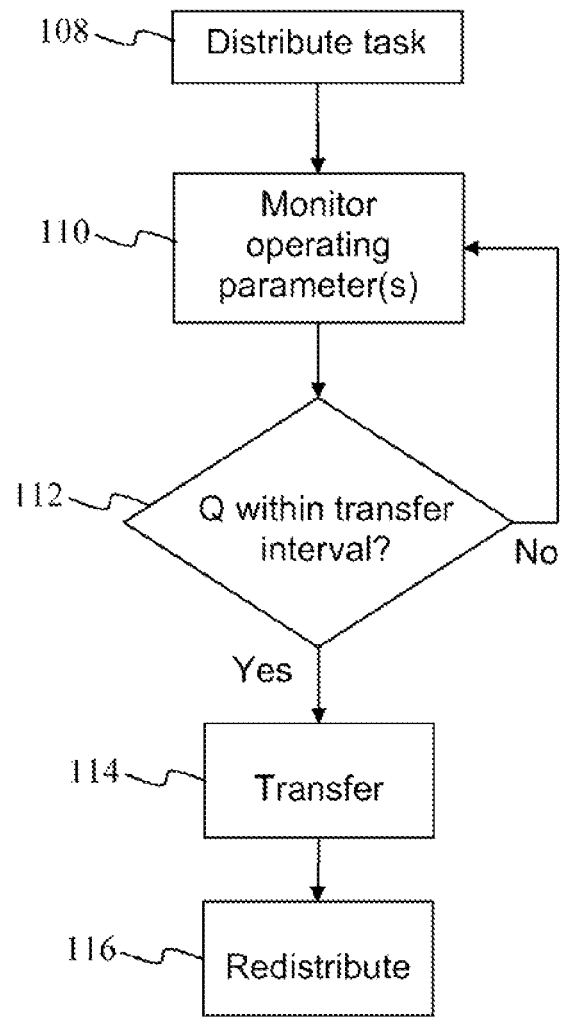
FIG. 3 is a flow chart of an embodiment of a method according to the present invention.

FIG. 3 illustrates an embodiment of a method according to the invention. The method comprises the step 108 of distributing a task to the first computation node. The method further comprises the step 110 of monitoring at least one operating parameter. In step 110, the signal strength of a signal from the coordinator node is measured in order to calculate a quality parameter in step 112. If the quality parameter falls within the transfer interval, the method proceeds to step 114, where information is transferred from the first computation node to the coordinator about a part of a task performed by the first computation node, in order to at least try to avoid loss of already performed part of the task. Otherwise, the method returns to monitoring of the at least one operating parameter. The information transferred in step 114 may additionally comprise information about the value of the quality parameter. After transfer in step 114, the method proceeds to step 116, where the coordinator node evaluates the information transferred from the first computation node and based on that redistributes the remaining part of the task for completion by computation nodes in the group. The remaining task may be redistributed to the first computation node or to other computation nodes in the group. Preferably, steps 110 and 112 are performed in the first computation node. In an embodiment of the method according to the present invention, steps 110 and 112 are performed in the coordinator node, thus requiring the coordinator node to send a request for transfer of information to the first computation node in step 114.

Figure 4:
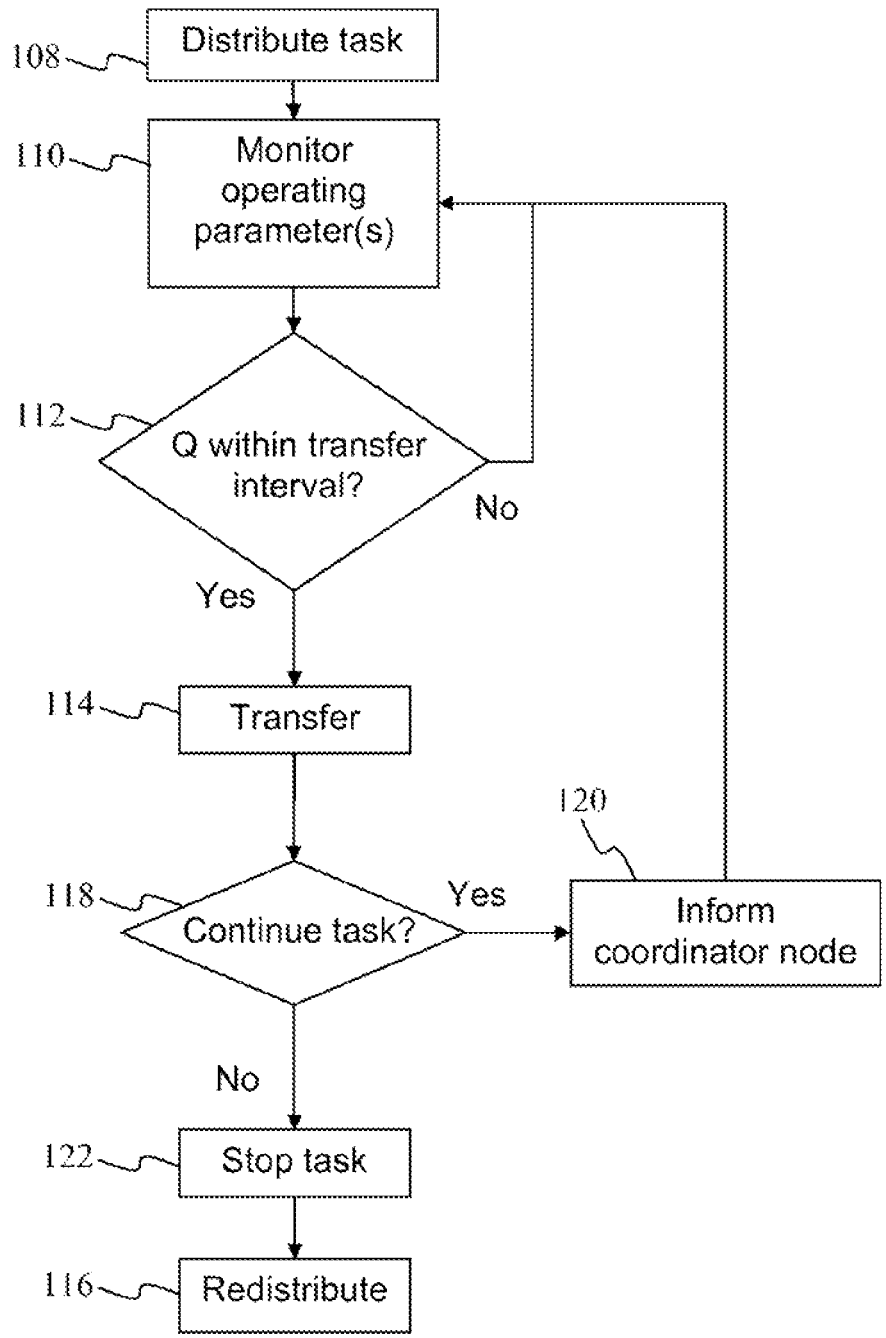
FIG. 4 is a flow chart of embodiment of a method according to the present invention.

FIG. 4 illustrates a further embodiment of a method according to the present invention. In the illustrated embodiment, the method proceeds to step 118 after step 114, where information about the performed pad of the task is transferred. Step 118 comprises the step of deciding whether the first computation node should stop or continue performing the task. This decision may be based on the quality parameter value. Alternatively or in addition, the decision may be based on if the transfer in step 114 was complete, or interrupted. If the task is continued, the method optionally proceeds to step 120, wherein the coordinator node, if the decision in step 118 is taken by the first computation node, is informed that the first computation node continues the task before returning to step 110.

In an embodiment of the present invention, the step of deciding whether to stop or continue performing the task after the step of transferring information about the performed part of the task comprises selecting a calculation scheme from a plurality of calculation schemes, e.g. based on the actual value of the quality parameter.

Figure 5:
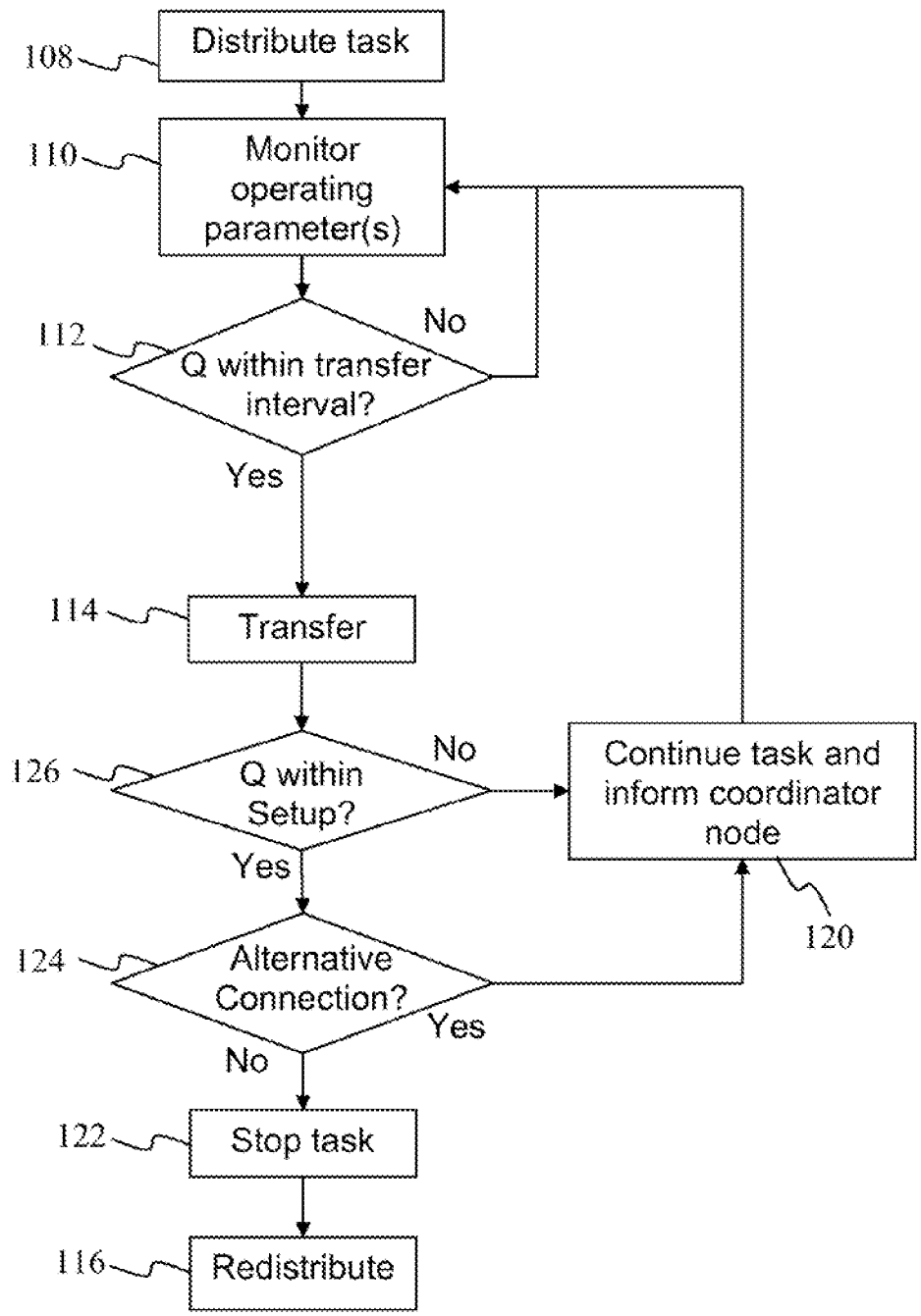
FIG. 5 is a flow chart of an embodiment of a method according to the present invention, FIG. 6 schematically illustrates a computation node according to the present invention, FIG. 7 schematically illustrates a coordinator node according to the present invention.

FIG. 5 illustrates a further embodiment of a method according to the invention. In addition to the steps earlier explained in connection with FIG. 4, the method further comprises the step 124 of attempting to set up an alternative connection between the coordinator node and the first computation node, e.g. the first computation node 12 sends a request towards the coordinator node 10. The step 124 of attempting to set up an alternative connection may depend on whether the value of the quality parameter Q is within a setup interval as illustrated by optional step 126. In addition or alternatively, the step 124 of attempting to set up an alternative connection may depend on current capacities and capabilities of the computation node, e.g. battery level, other work load, memory status and the like. In step 120, the first computation node continues the task and optionally informs the coordinator node accordingly.

In the illustrated embodiment, the step 124 of attempting to set up an alternative connection between the coordinator node and the first computation node includes attempting to set up a new connection between the coordinator node and the first computation node if the quality parameter indicates that the connection between the coordinator node and the computation node, e.g. the first connection 16, is broken.

The alternative connection between the coordinator node and the first computation node may be a connection via one or more other nodes in the system, e.g. a second computation node in the same group and/or a second coordinator node in the same or a different group.

In the computation node according to the present invention, the monitor device may be adapted for measuring the signal strength of one or more signals between the coordinator node and the computation node. In an embodiment, the monitor device is adapted for measuring the signal strength of a signal from the coordinator node, which signal indicates presence of the coordinator node.

The quality parameter Q may be determined by the computation node or following a more centralized approach the quality parameter may be determined by the coordinator. The quality parameter may be determined or calculated based on one or a plurality of operating parameter. In an embodiment of the computation node, the calculator device may be adapted for determining the quality parameter based on the signal-to-noise ratio of a signal between the coordinator node and the computation node.

The transmitter device of the computation node may be adapted to transfer information to the coordinator node when the value of the quality parameter falls below a transfer threshold value, i.e. if $Q<T_{Transfer}$. The transmitter device may comprise a transceiver.

In an embodiment of the computation node, the quality parameter is calculated as the signal-to-noise ratio of a signal from the coordinator node.

Further, the computation node may be adapted to decide whether to stop or continue performing the task after transferring information about the performed part of the task. The decision may be based on the value of the quality parameter, which may indicate that no connection is available between the computation node and the coordinator node, e.g. by having the value zero.

Furthermore, the computation node may be adapted for attempting to set up an alternative connection between the coordinator node and the computation node, when the value of the quality parameter fails within a setup interval, e.g. when the quality parameter Q equals or falls below a setup threshold value.

The computation node may be adapted to transfer information to the coordinator node, wherein the information comprises information indicating that the value of the quality parameter has fallen within the transfer interval, e.g. that the signal to noise ratio for the connection between the computation node and the coordinator node has fallen below a transfer threshold $T_{transfer}$.

Figure 6:
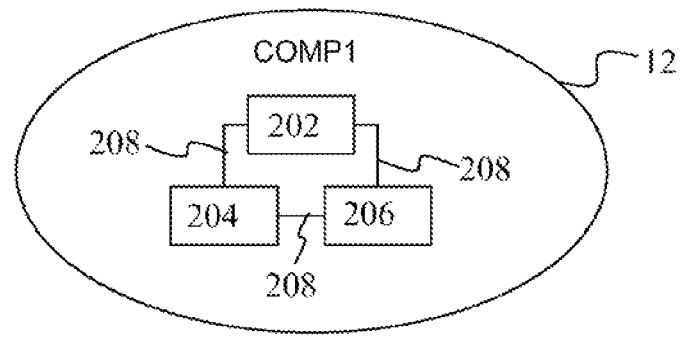

FIG. 6 schematically illustrates an embodiment of a computation node for agile computing according to the invention, e.g. a first computation node for use in the method according to the present invention. The computation node 12 is adapted to receive and perform a task from a coordinator node, e.g. coordinator node 10, via a connection, e.g. the first connection 16. The computation node 12 comprises a monitor device 202 adapted to monitor an operating parameter, e.g. the signal strength of a signal from the coordinator node, indicating the quality of the connection 16, and a calculator device 204 adapted to determine the signal-to-noise ratio as a quality parameter based on the measured signal strength. Furthermore, the computation node 12 comprises a transmitter device 206 adapted to transfer information from the computation node 12 to the coordinator node 10, when the value of signal-to-noise-ratio falls below a transfer threshold value. The transferred information comprises information about a part of the task performed by the computation node 12. The devices 202, 204, 206 are interconnected via wires 208.

Furthermore, the computation node 12 is adapted to decide whether to stop or continue performing the task upon transfer of the information. The decision is based on the value of the quality parameter, which is frequently updated, e.g. each 2 seconds.

Additionally, the computation node 12 is adapted for attempting to set up an alternative connection between the coordinator node 10 and the computation node 12 via another node in the group, e.g. the second computation node 14, when the value of the quality parameter falls below a setup threshold value.

A coordinator node according to the invention may be adapted to determine the distribution of the remaining part of the task of the first computation node based on information from the first computation node. Further, the coordinator node may be adapted to redistribute the remaining part of the task or the full task of the first computation node to at least one computation node in the group, e.g. to the first computation node if the connection is still of sufficient quality or has been restored, or to a second computation node having available capacity.

Figure 7:
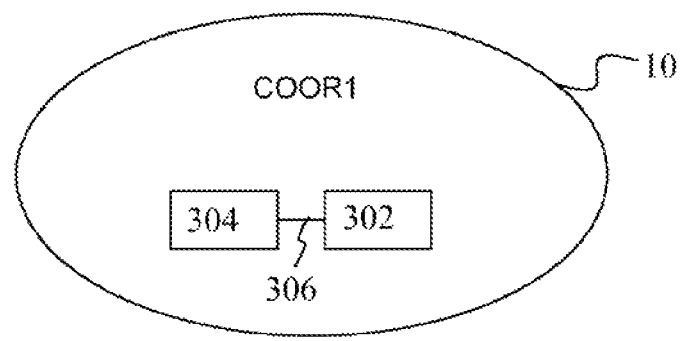

FIG. 7 schematically illustrates a coordinator node 10 according to the present invention. The coordinator node 10 comprises a processor 302 and a transceiver device 304 interconnected by a wire 306. The processor 302 is adapted to determine distribution of and distribute tasks to one or more computation nodes in a group. Furthermore, the coordinator node 10 comprises a transceiver device 304 that is adapted to receive information from a first computation node 12 about a part of a task distributed to the first computation node when a quality parameter that is determined on basis of on one or more operating parameters falls within a transfer interval.

Furthermore, the coordinator node 10 is adapted to determine the distribution of the remaining part of the task from the first computation node based on information from the first computation node, and by means of the transceiver device 304 adapted to distribute the remaining part of the task of the first computation node to at least one computation node in the group.

Figure 8:
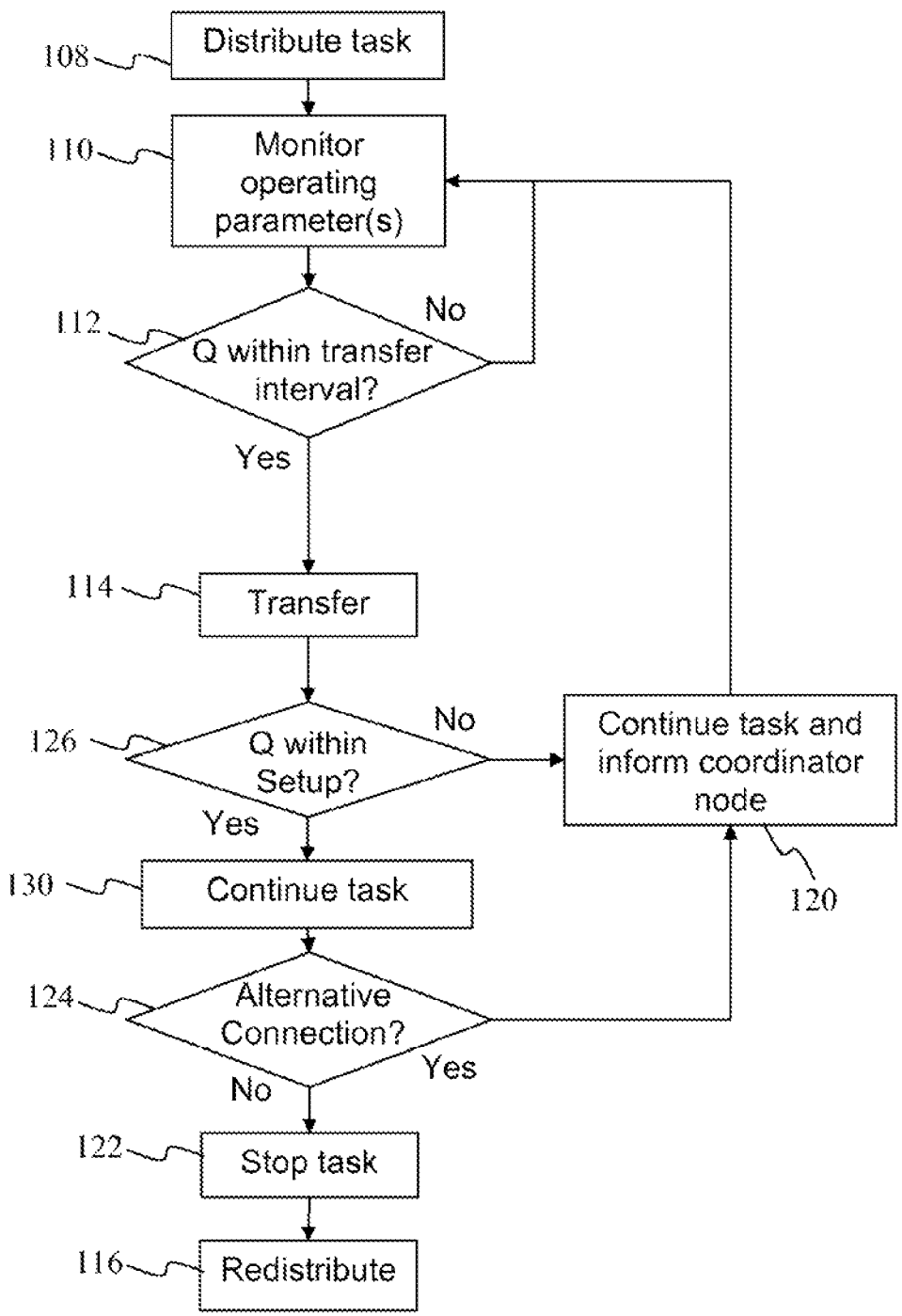
FIG. 8 is a flow chart of an embodiment of a method according to the present invention

In an embodiment of the present invention, the first computation node continues performing the task for a predefined time period before attempting to reconnect the coordinator node and the first computation node either directly or via one or more other nodes. Such an embodiment is illustrated in FIG. 8, wherein the method in addition to the steps of the exemplary method in FIG. 5 further comprises the step 130 of continuing the task for a predefined period of time, e.g. for a period larger than 10 seconds, such as from about 10 seconds to about 10 minutes. The predefined time period may have a predefined length, such as about 30 seconds, 1 minute, 3 minutes, or 5 minutes. The length of the time period may depend on the value of the quality parameter.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

The invention claimed is:

1. A computation node for agile computing and for receiving a task to be performed from a coordinator node via a connection, the computation node comprising:
    one or more processors and one or more memory units containing instructions that, when executed by the one or more processors, cause the computation node to implement:
    a monitor device for monitoring at least one operating parameter indicating the quality of the connection between the coordinator node and the computation node,
    a calculator device for determining a quality parameter based on the at least one operating parameter, wherein the quality parameter indicates the quality of the connection between the coordinator node and the computation node, and
    a transmitter device for transferring information from the computation node to the coordinator node when the value of the quality parameter falls within a transfer interval, the information comprising information about a part of the task performed by the computation node,
    wherein the computation node is configured to receive the task from the coordinator node via the connection and transfer the information to the coordinator node via the connection, and
    wherein the transmitter device is arranged for transferring information to the coordinator node when the value of the quality parameter falls below a transfer threshold value.

2. The computation node according to claim 1, wherein the information about a part of the task performed by the computation node comprises information that the value of the quality parameter has fallen within the transfer interval.

3. The computation node according to claim 1, wherein the monitor device is arranged for measuring the signal strength of a signal between the coordinator node and the computation node;
    the calculator device is arranged for determining the quality parameter based on the signal-to-noise ratio of a signal between the coordinator node and the computation node.

4. The computation node according to claim 1, wherein the computation node is arranged for deciding whether to stop or continue performing the task after transferring information about the performed part of the task.

5. The computation node according to claim 1, wherein the computation node is arranged for setting up an alternative connection between the coordinator node and the computation node, when the value of the quality parameter falls within a setup interval.

* * * * *

UNITED STATES PATENT AND TRADEMARK OFFICE
CERTIFICATE OF CORRECTION

PATENT NO. : 8,959,210 B2
APPLICATION NO. : 13/664600
DATED : February 17, 2015
INVENTOR(S) : Nielsen It is certified that error appears in the above-identified patent and that said Letters Patent is hereby corrected as shown below:

In the Specification

In Column 1, Line 7, delete "2010," and insert -- 2010, now Pat. No. 8,326,979 --, therefor.

In Column 1, Line 15, delete "particular" and insert -- in particular --, therefor.

In Column 3, Line 1, delete "of embodiment" and insert -- of an embodiment --, therefor.

In Column 6, Line 41, delete "pad" and insert -- part --, therefor.

In Column 7, Line 38, delete "$Q<T_{Transfer}$." and insert -- $Q<T_{transfer}$. --, therefor.

Signed and Sealed this
Fourteenth Day of July, 2015

Michelle K. Lee
*Director of the United States Patent and Trademark Office*